(12) United States Patent
Matsushita et al.

(10) Patent No.: US 7,294,917 B2
(45) Date of Patent: Nov. 13, 2007

(54) IC TAG

(75) Inventors: Taiga Matsushita, Tokyo (JP);
Masateru Yamakage, Matsudo (JP);
Yasukazu Nakata, Matsudo (JP)

(73) Assignee: Lintec Corporation, Tokyo (JP)

(*) Notice: Subject to any disclaimer, the term of this patent is extended or adjusted under 35 U.S.C. 154(b) by 0 days.

(21) Appl. No.: 10/535,843

(22) PCT Filed: Nov. 20, 2003

(86) PCT No.: PCT/JP03/14827

§ 371 (c)(1),
(2), (4) Date: May 20, 2005

(87) PCT Pub. No.: WO2004/047017

PCT Pub. Date: Jun. 3, 2004

(65) Prior Publication Data

US 2006/0139174 A1   Jun. 29, 2006

(30) Foreign Application Priority Data

Nov. 21, 2002  (JP)  ............................. 2002-338640
Dec. 16, 2002  (JP)  ............................. 2002-364031

(51) Int. Cl.
*H01L 23/02*  (2006.01)

(52) U.S. Cl. .............................. 257/679; 257/E23.064; 340/572.1; 340/572.7

(58) Field of Classification Search ................ 257/679, 257/782, 783, 664, E23.064, E23.176; 340/572.8, 340/572.1, 572.7; 235/492; 343/700
See application file for complete search history.

(56) References Cited

U.S. PATENT DOCUMENTS 6,421,013 B1 * 7/2002 Chung ................. 343/700 MS
6,888,509 B2 * 5/2005 Atherton .................... 343/718
2002/0036237 A1   3/2002 Atherton et al.

FOREIGN PATENT DOCUMENTS

| EP | 1 132 859 A2 | 9/2001 |
| JP | 2000-105807 A | 4/2000 |
| JP | 2001-13874 A | 1/2001 |
| JP | 2001-109 866 A | 4/2001 |
| WO | WO 02/082126 A1 | 10/2002 |

* cited by examiner

*Primary Examiner*—Sue A. Purvis
*Assistant Examiner*—Benjamin Tzu-Hung Liu
(74) *Attorney, Agent, or Firm*—Sughrue Mion Pllc.

(57) ABSTRACT

The present invention provides an IC tag which has a structure comprising a first adhesive layer laminated on a surface of a substrate sheet, an electronic circuit containing a circuit line having a bypass line and an IC chip connecting to the electronic circuit which are formed on a surface of the first adhesive layer, a second adhesive layer laminated for covering the electronic circuit and the IC chip, and a release agent layer formed partly at the position corresponding to a circuit section consisting of the electronic circuit and the IC chip and located at the interface between the substrate sheet and the first adhesive layer, wherein the angle formed by the tangent of the bypass line at the connection between the bypass line and the circuit line and the tangent of the circuit line at the connection is 10 degree or greater. When the IC tag attached to an article is peeled off, the built-in electronic circuit is surely broken.

7 Claims, 8 Drawing Sheets

IC TAG

This is a National Stage entry of International Application PCT/JP2003/014827, with an international filing date of Nov. 20, 2003, which was published under PCT Article 21(2) on Jun. 3, 2004 as WO 2004/047017 A1, and the complete disclosure of which is incorporated into this application by reference.

FIELD OF THE INVENTION

The present invention relates to an IC tag which can break a built-in electronic circuit when the IC tag attached to an article is peeled off.

DESCRIPTION OF THE PRIOR ART

By attaching an IC tag to articles such as goods, storage articles and loadings, article managements have been conducted recently. For example, the article management has been conducted by attaching an IC tag recorded by information such as production condition, stock state, cost information and used condition to the goods and further confirming the information by an interrogator, according to needs.

However, when the IC tag attached to the article is insufficient in the adhesive strength of the adhesive used in the IC tag, the IC tag may be re-attached to another article by any causes such as errors and careless mistakes. And, the IC tag may be re-attached to another article intentionally. In such situation, article management can be not correctly conducted longer.

As conventional IC tags, it is described that when the substrate laminated on the surface of the tag is altered, the surface substrate is broken in the layer so that the effect for preventing a forgery is increased (JP 10-171962A1).

However, there is a problem that when the IC tag is peeled by providing a cutting into the interface between an article and an adhesive layer of the IC tag attached to the article with a cutter or the like, inserting a finger or the like into the cutting portion and pinching the end of the IC tag, the surface substrate can be easily peeled from the electronic circuit without breaking of the electronic circuit.

DISCLOSURE OF THE INVENTION

As the method for solving the problems described above, it is required to conduct the article management correctly by damaging the function of the IC tag, when the IC tag is re-attached to another article.

As a result of efforts by the present inventors to solve the above-described problems, it was found that the problems described above are achieved by laminating a first adhesive layer on a substrate sheet, forming an electronic circuit containing a circuit line having a bypass line, in which the angle formed by the tangent of the bypass line at the connection between the bypass line and the circuit line and the tangent of the circuit line at the connection is 10 degree or greater, and an IC chip connecting to the electronic circuit on the surface of the first adhesive layer, laminating a second adhesive layer for covering the electronic circuit and the IC chip, and forming a release agent layer partly at the position corresponding to a circuit section consisting of the electronic circuit and the IC chip and located at the interface between the substrate sheet and the first adhesive layer. Also, it was found that the problems described above are achieved by laminating a first adhesive layer on a surface of a substrate sheet, forming an electronic circuit having a planar projection extended and an IC chip connecting to the electronic circuit on the surface of the first adhesive layer, laminating a second adhesive layer for covering the electronic circuit and the IC chip, and forming a release agent layer partly at the position corresponding to a circuit section consisting of the electronic circuit and the IC chip and located at the interface between the substrate sheet and the first adhesive layer. And thus the present invention is completed.

That is to say, the present invention provides an IC tag which has a structure comprising a first adhesive layer laminated on a surface of a substrate sheet, an electronic circuit containing a circuit line having a bypass line, in which the angle formed by the tangent of the bypass line at the connection between the bypass line and the circuit line and the tangent of the circuit line at the connection is 10 degree or greater, and an IC chip connecting to the electronic circuit which are formed on a surface of the first adhesive layer, a second adhesive layer laminated for covering the electronic circuit and the IC chip, and a release agent layer formed partly at the position corresponding to a circuit section consisting of the electronic circuit and the IC chip and located at the interface between the substrate sheet and the first adhesive layer.

The present invention also provides the IC tag as described above, wherein at least one of bypass line is formed at the position in the circuit section in which the release agent layer is formed.

The present invention also provides the IC tag as described above, wherein a planar projection is extended to the bypass line.

The present invention also provides an IC tag which has a structure comprising a first adhesive layer laminated on a surface of a substrate sheet, an electronic circuit having a planar projection extended and an IC chip connecting to the electronic circuit which are formed on a surface of the first adhesive layer, a second adhesive layer laminated for covering the electronic circuit and the IC chip, and a release agent layer formed partly at the position corresponding to a circuit section consisting of the electronic circuit and the IC chip and located at the interface between the substrate sheet and the first adhesive layer.

The present invention also provides an IC tag which has a structure comprising a first adhesive layer laminated on a surface of a substrate sheet, an electronic circuit having a planar projection extended and an IC chip connecting to the electronic circuit which are formed on a surface of the first adhesive layer, a second adhesive layer laminated for covering the electronic circuit and the IC chip, and a release agent layer formed partly at the position corresponding to both end portions of a circuit section consisting of the electronic circuit and the IC chip and located at the interface between the substrate sheet and the first adhesive layer.

The present invention also provides the IC tag as described above, wherein at least one of bypass line is formed at the position in the circuit section in which the release agent layer is formed.

The present invention also provides the IC tag as described above, wherein the planar projection has an area calculated according to the following formula.

$$S \geq (2W)^2$$

(In the formula, S is an area of the planar projection, and W is a line width of the circuit line adjoining to the planar projection.) The present invention also provides the IC tag as described above, wherein the release agent layer is formed to cover the range of 20 to 90 percents of an area surrounded by an outside circumference of the circuit section through the first adhesive layer.

The present invention also provides the IC tag as described above, wherein a release liner is formed on a surface of the second adhesive layer.

The IC tag of the present invention can break a built-in electronic circuit surely when the IC tag attached to an article is peeled off.

BRIEF DESCRIPTION OF THE DRAWINGS

FIG. 3a shows a perspective plane view of an IC tag of another embodiment of the present invention and FIG. 3b shows a cross-section along line 3b-3b of FIG. 3a;

FIG. 6a shows a perspective plane view of an electronic circuit of another embodiment in an IC tag of the present invention and FIG. 6b shows a cross-section along line 6b-6b of FIG. 6a;

In drawings, 1 means a substrate sheet, 2 means a first adhesive layer, 3 means an electronic circuit, 4 means a circuit line, 5 means a second adhesive layer, 6 means an IC chip, 7 means a release agent layer, 8 means a bypass line, 9 means a planar projection, 10 means a bonding line, 11 means a release liner, 12 means an article, 13 means a circuit section, 14 means a connection between the bypass line and the circuit line, 15 means a tangent of the bypass line at the connection between the bypass line and the circuit line, 16 means a tangent of the circuit line at the connection between the bypass line and the circuit line, and 17 means a cutting.

DETAILED DESCRIPTION OF THE PREFERRED EMBODIMENTS

Figure 1:
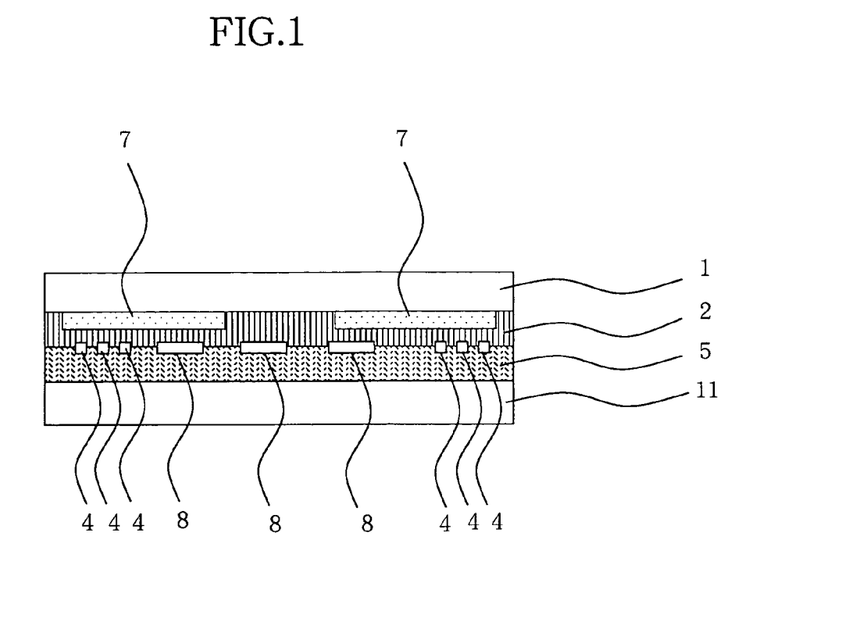
FIG. 1 shows an outline of a cross-section of an IC tag of one embodiment of the present invention.
Figure 7:
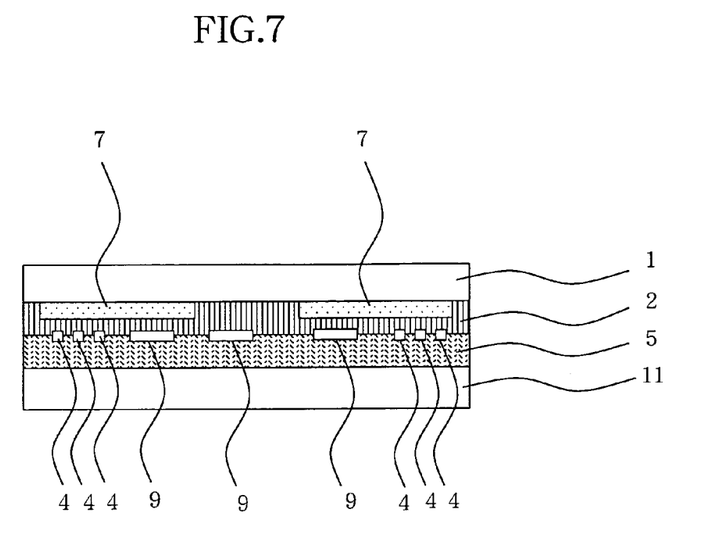
FIG. 7 shows an outline of perspective cross-section of an IC tag of other one embodiment of the present invention.

The IC tag of the present invention is explained based on the drawings. FIG. 1 and FIG. 7 shows an outline of a cross-section of an IC tag of one embodiment of the present invention.

The substrate sheet 1 is preferably a sheet composed of a thermoplastic resin.

As the sheet composed of the thermoplastic resin, for example, the sheets composed of one or more of various synthetic resins, such as polyolefin resin like polyethylene resins of high density polyethylene, middle density polyethylene, low density polyethylene and the like, polypropylene resins of polypropylene, polymethyl-1-pentene/ethylene/cyclic olefin copolymer, and ethylene-vinyl acetate copolymer; polyester resins like polyethylene terephthalate, polyethylene naphthalate, polybutylene terephthalate; polyvinyl chloride resins; polyvinylalcohol resins; polycarbonate resins; polyamide resins; polyimide resins; fluororesins; copolymers containing two or more polymerization units thereof; polymer blends containing two or more resins thereof; polymer alloys containing one or more resins thereof can be used. In particular, the sheets composed of polyester resins are preferably used. The substrate sheet 1 may be oriented uniaxially or biaxially. The substrate sheet 1 may be composed of single layer or two or more layers of different layers or same layers. Also, the substrate sheet 1 has preferably water resistance. If the substrate sheet has water resistance, a damage such as breaking of the substrate sheet is not caused when the substrate sheet is wet with water.

Thickness of the substrate sheet 1 does not have any limitation. However, the thickness is generally in the range of 10 to 250 μm and preferably in the range of 20 to 100 μm.

For increasing the adhesive strength between the substrate sheet 1 and the first adhesive layer 2, the surface of the substrate sheet 1 can be surface-treated. The surface-treatment includes, for example, corona discharge treatment, chemical treatment, resin-coating and the like.

Adhesives used in the first adhesive layer 2 include various adhesives such as thermo melting adhesives, pressure sensitive adhesives and thermosetting adhesives. The kinds of the adhesive include, for example, natural rubber adhesives, synthetic rubber adhesives, acrylic resin adhesives, polyester resin adhesives, polyvinyl ether resin adhesives, urethane resin adhesives and silicone resin adhesives.

Examples of the synthetic rubber adhesives include styrene-butadiene rubber, polyisobutylene rubber, isobutylene-isoprene rubber, isoprene rubber, styrene-isoprene block copolymer, styrene-butadiene block copolymer, styrene-ethylene-butylene block copolymer, ethylene-vinyl acetate thermoplastic elastomer and the like. Examples of the acrylic resin adhesives include homopolymers of monomer such as acrylic acid, methyl acrylate, ethyl acrylate, propyl acrylate, butyl acrylate, 2-ethylhexyl acrylate, methyl methacrylate, ethyl methacrylate, butyl methacrylate, and acrylonitrile, or copolymers of 2 or more of monomers thereof. Polyester resin adhesives are copolymers of a polyhydric alcohol and a polybasic acid. The polyhydric alcohol includes ethylene glycol, propylene glycol, and butanediol. The polybasic acid includes terephthalic acid, adipic acid, and maleic acid. Examples of the polyvinyl ether resin adhesives include polyvinyl ether, and polyvinyl isobutyl ether. Examples of the silicone resin adhesives include dimethyl polysiloxane. The adhesives can be used singly or in combination of two or more members.

Among the adhesives, the polyester resin adhesives are preferable.

A tackifier, a softener, an antioxidant, a filler, a coloring agent such as a dye and a pigment or the like can be mixed in the first adhesive layer 2, according to needs.

The tackifier includes rosin resins, terpene phenol resins, terpene resins, aromatic hydrocarbon modified terpene resins, petroleum resins, coumarone-indene resins, styrene resins, phenol resins and xylene resins. The softener includes process oils, liquid rubbers and plasticizers. The filler includes silica, talc, clay, calcium carbonate and the like.

Thickness of the first adhesive layer 2 does not have any limitation. However, the thickness is generally in the range of 1 to 100 μm and preferably in the range of 3 to 50 μm.

In the IC tag of the present invention, the release agent layer 7 is formed partly at the position corresponding to a circuit section 13 consisting of the electronic circuit 3 and the IC chip 6 and located at the interface between the substrate sheet 1 and the first adhesive layer 2.

The release agent layer 7 is formed in plural members of 2 or more, which are respectively arranged at interval. The shape and size of the release agent layer 7, and the space between each release agent layers 7 are not particularly limited. Various shapes, sizes and spaces can be utilized.

Figure 2:
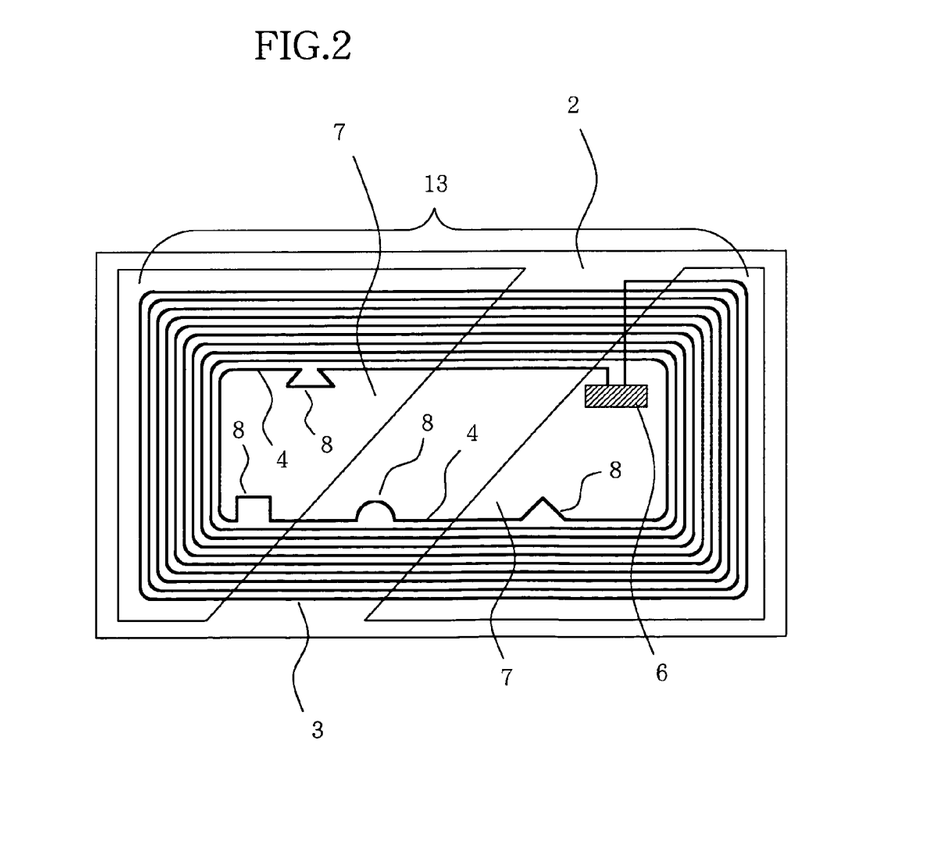
FIG. 2 shows a perspective plane view of an electronic circuit of one embodiment in an IC tag of the present invention.
Figure 3:
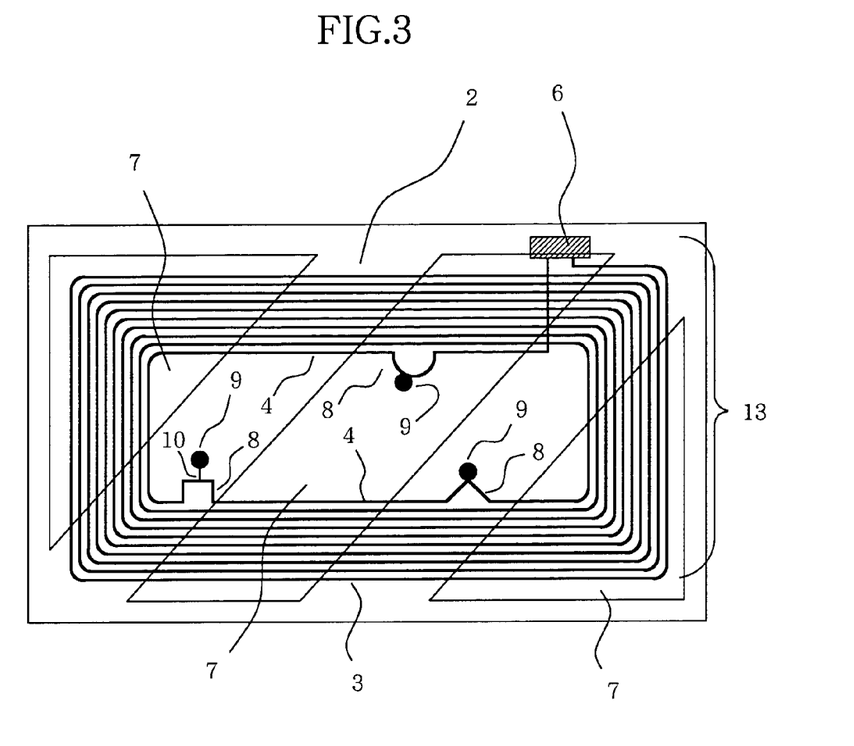
Figure 3A:
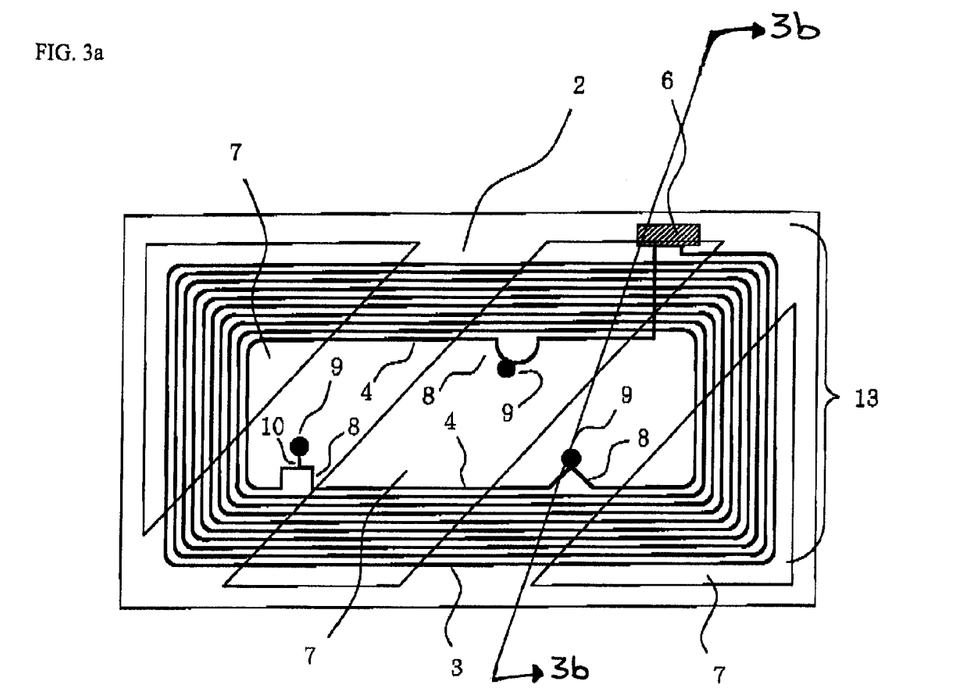
Figure 3B:
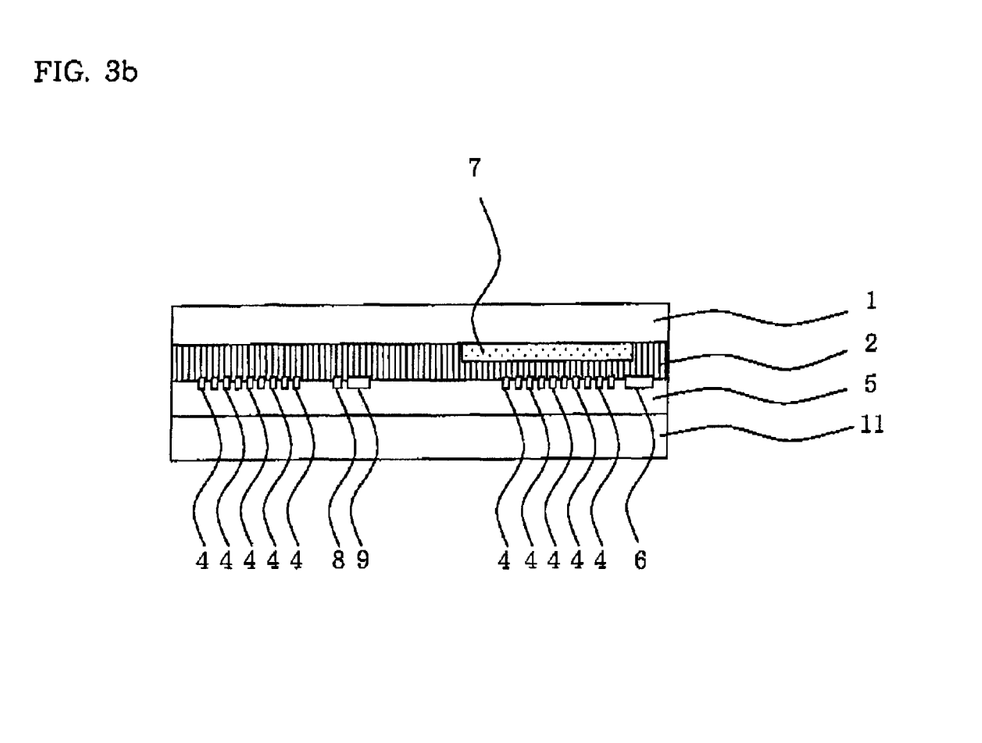
Figure 6:
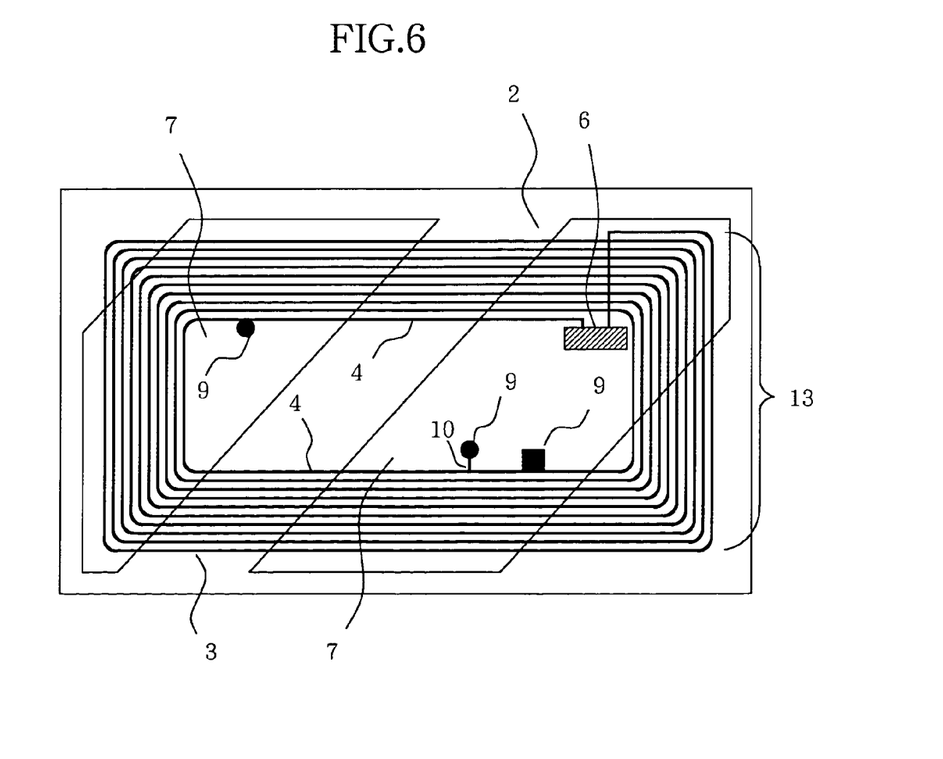
Figure 6A:
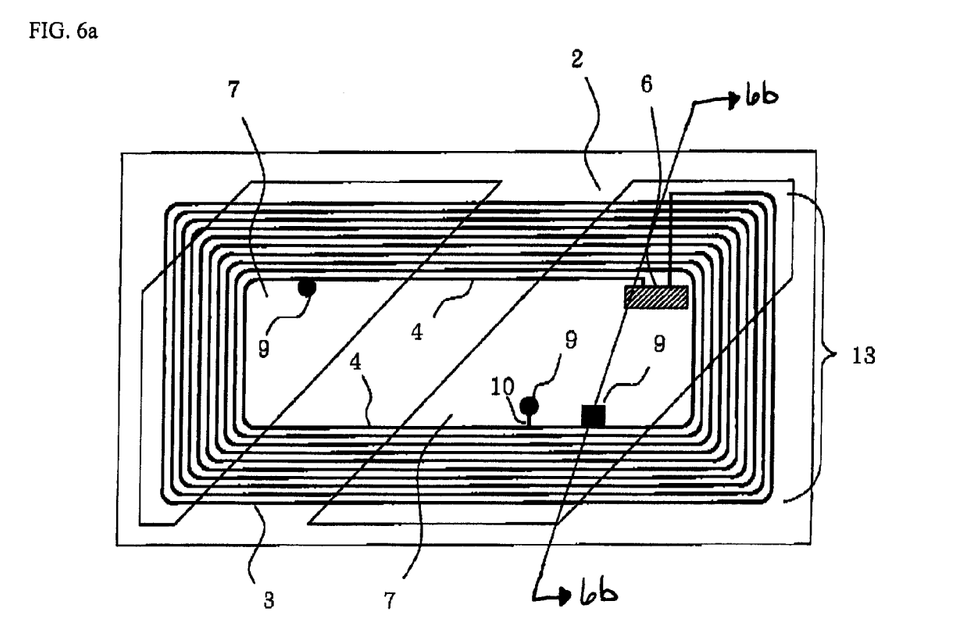
Figure 6B:
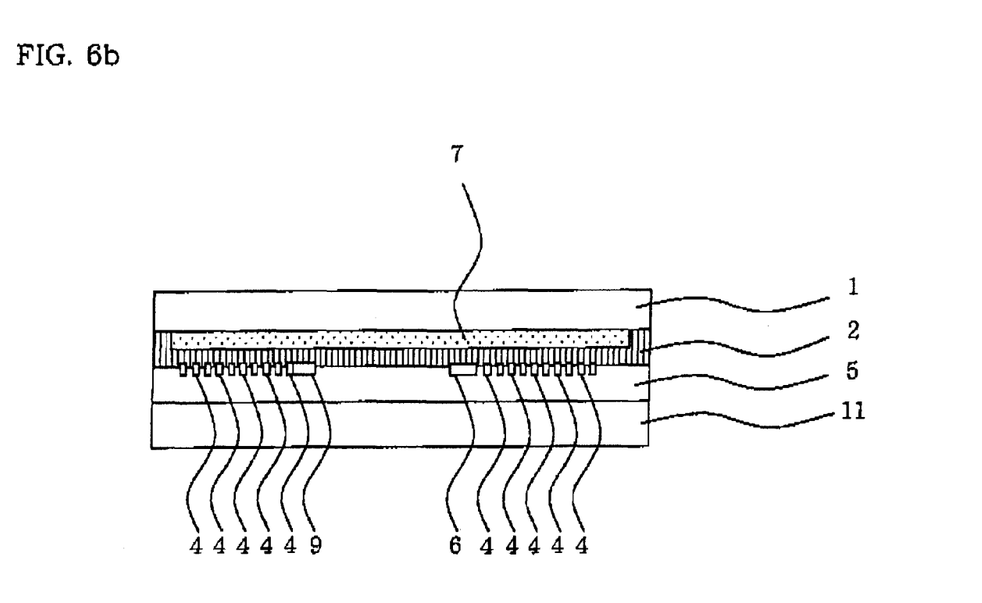
Figure 8:
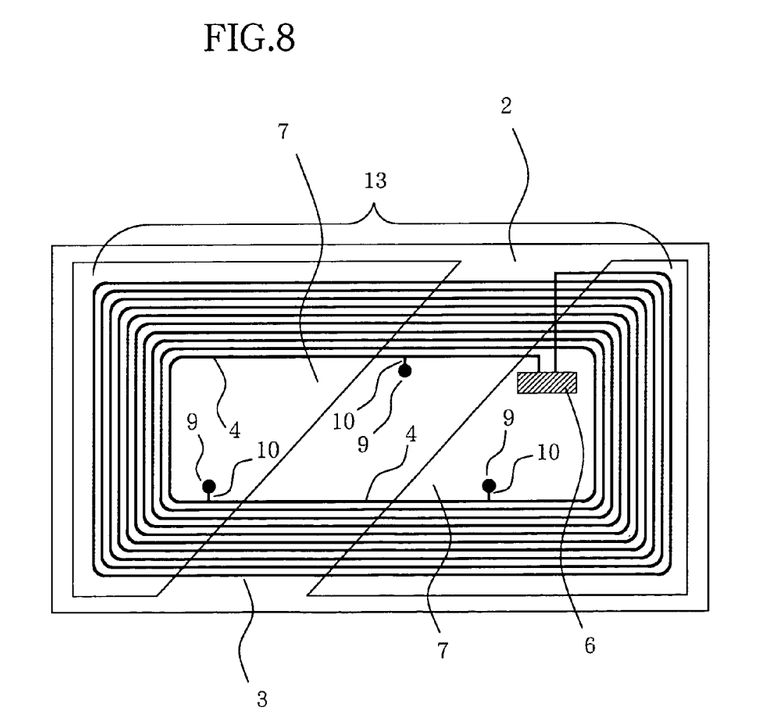
FIG. 8 shows a perspective plane view of an electronic circuit of other one embodiment in an IC tag of the present invention.
Figure 9:
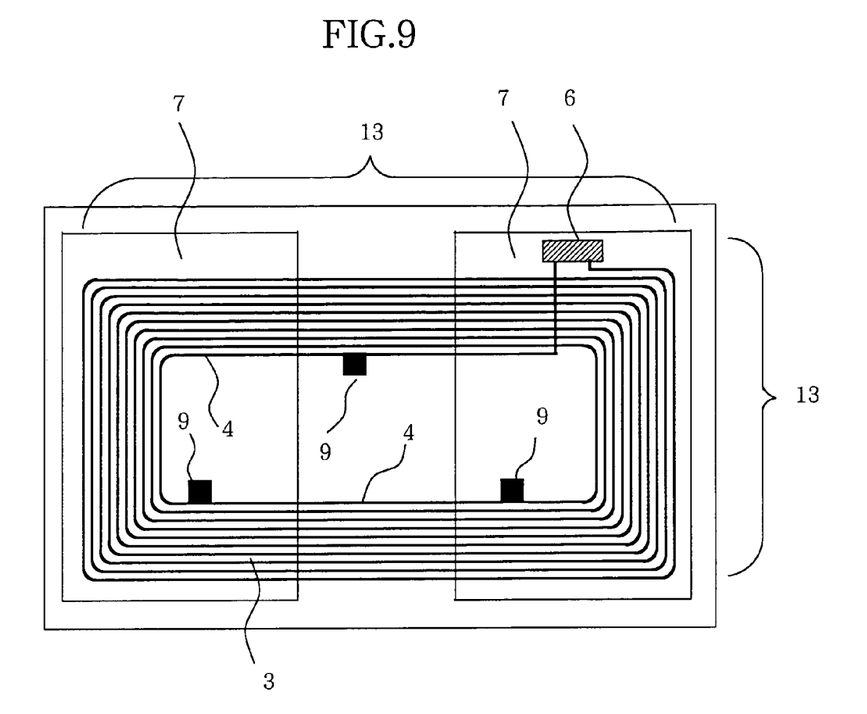
FIG. 9 shows a perspective plane view of an electronic circuit of other one embodiment in an IC tag of the present invention.

For example, as shown in FIG. 2, FIG. 8 and FIG. 9, the release agent layer 7 can be formed to cover all surface at the position corresponding to the both ends of the circuit section 13, or as shown in FIGS. 3*a* and 3*b*, the release agent layer 7 can be formed at the position corresponding to the intermediate section of the circuit section 13, but it is needed to leave the section at which the release agent layer 7 is not covered. And as shown in FIGS. 6*a* and 6*b*, the release agent layer 7 can be formed without covering of all surface at the position corresponding to the both ends of the circuit section 13 and with leaving of a section not to be covered in part. Further, the release agent layer 7 can be formed at the position corresponding to the intermediate section of the circuit section 13 without forming of the release agent layer at the position corresponding to the both ends of the circuit section 13.

As the result of such structure, the first adhesive layer 2 is laminated directly on the surface of the substrate sheet 1 at positions without forming of the release agent layer 7. And the first adhesive layer 2 is laminated directly on the release agent layer 7 at positions with forming of the release agent layer 7. Therefore, when the IC tag is peeled off after the IC tag is attached to the article 12, for example, the first adhesive layer 2 is peeled in interface between the first adhesive layer 2 and the release agent layer 7 at positions with forming of the release agent layer 7, and the IC tag is torn in interface between the article 12 and the second adhesive layer 5, or in the second adhesive layer 5, at positions without forming of the release agent layer 7. Accordingly, the electronic circuit 3 is peeled off together with the substrate sheet 1 in the state that the electronic circuit 3 is attached to the first adhesive layer 2, and then the electronic circuit 3 is cut.

The release agent layer 7 is formed to cover the range of preferably 20 to 90 percents, more preferably 40 to 80 percents of an area surrounded by an outside circumference of the circuit section 13 through the first adhesive layer 2.

The release agent layer 7 is preferably formed as the release agent layer 7 projects over the outside circumference of the circuit section 13. The width of the projecting area of the release agent layer 7 does not have any limitation. However, the width is preferably in the range of not less than 1 mm.

The shape of the release agent layer 7 includes preferably triangle, quadrangle, polygons such as pentagon and polygons having more than five angles, ellipse and circle (referred to FIG. 2, FIG. 3*a* and FIG. 6*a*). Two shapes of the release agent layer 7 may be same or different from. Two of the release agent layer 7 are preferably separated perfectly and individually, but may be connected at a part of the release agent layer 7.

Release agents used in the release agent layer 7 include, for example, silicone resin, long chain alkyl group-containing resin and fluororesin.

Thickness of the release agent layer 7 does not have any limitation. However, the thickness is preferably in the range of 0.01 to 5 μm and more preferably in the range of 0.03 to 1 μm.

In the IC tag of the present invention, the electronic circuit 3 is formed on a surface of the first adhesive layer 2.

The electronic circuit 3 is composed of circuit line 4 of a conductive material. The conductive material includes, for example, metal simple substance such as metallic foil, vapor deposition film and thin film produced by sputtering. As the metal simple substance, gold, silver, nickel, copper, aluminium and the like can be used. Also, as the conductive material, conductive pastes produced by dispersing a particle of metal such as gold, silver, nickel and copper in a binder, can be used.

The average particle diameter of the metal particle is preferably in the range of 1 to 15 μm and more preferably in the range of 2 to 10 μm. The binder includes, for example, polyester resins, polyurethane resins, epoxy resins and phenol resins.

Thickness of the layer of circuit line 4 forming the electronic circuit does not have any limitation. However, the thickness of the metallic foil is preferably in the range of 5 to 50 μm, and the thickness of the vapor deposition film or metallic film produced by spattering is preferably in the range of 0.01 to 1 μm and the thickness of conductive paste is preferably in the range of 5 to 30 μm.

The width of the circuit line 4 is not particularly limited, but preferably in the range of 0.01 to 10 mm, more preferably in the range of 0.1 to 3 mm.

The method for forming the electronic circuit 3 on the surface of the first adhesive layer 2, include, for example, a method for forming the electronic circuit 3 by adhering a metallic foil to the substrate sheet 1 with adhesive, etching-treating the metallic foil and then removing sections other than the electronic circuit. The etching-treatment can be conducted by the same treatment as general etching-treatment. The forming of the electronic circuit 3 to the surface of the first adhesive layer 2 can be also conducted by adhering the conductive paste in the shape of the electronic circuit 3 to the surface of the first adhesive layer 2 by means such as printing and application.

The shape of the electronic circuit 3 includes, for example, shapes indicated by FIG. 2 and FIG. 3. In FIG. 2 and FIG. 3*a*, the electronic circuit 3 as an antenna is formed by arranging the circuit line 4 of a line of conductive material in decaplet ring having specific space between each lines in the direction from the outside circumference of a rectangle substrate sheet 1 to the inside. The electronic circuit 3 may be arranged in decaplet ring as indicated in FIG. 2 and FIG. 3*a*, or may be arranged in singlet ring to nine ring, or eleven or more multiplet ring.

Figure 5:
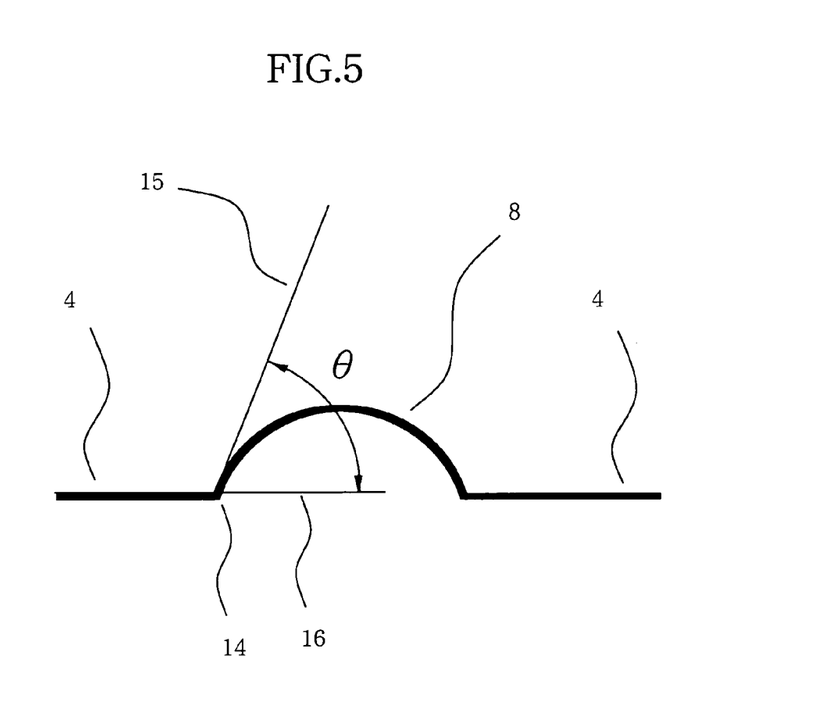
FIG. 5 shows a plane view of a shape of a circuit line and a bypass line of one embodiment in an IC tag of the present invention.

The circuit line 4 in the electronic circuit 3 has the bypass line 8. The circuit line 4 having a bypass line 8 can be a most inside circuit line 4, a most outside circuit line 4, or any one of the intermediate circuit lines 4. The angle formed by the tangent 15 of the bypass line 8 at the connection 14 between the bypass line 8 and the circuit line 4 and the tangent 16 of the circuit line 4 at the connection is described as angle $\theta$ in FIG. 5. The angle $\theta$ is 10 degree or greater, preferably 45 degree or greater, more preferably 80 degree or greater. The upper limitation of the angle $\theta$ is preferably less than 180 degree.

Figure 4:
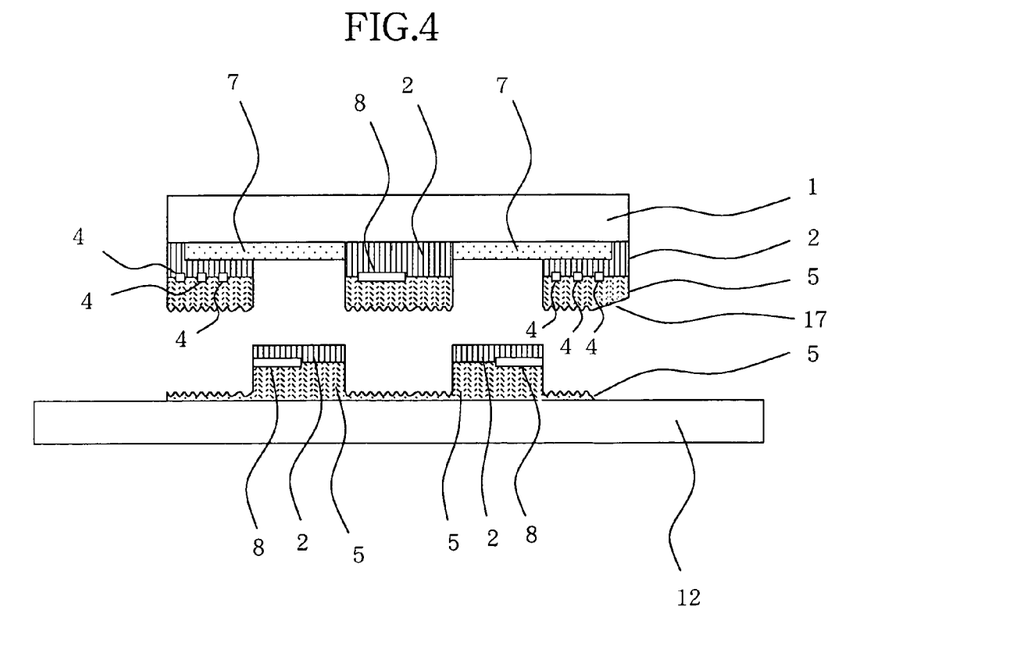
FIG. 4 shows an outline of cross-section of a state that an IC tag of other one embodiment of the present invention is peeled off.

As the result of such structure, as shown in FIG. 4, the first adhesive layer 2 is peeled off at the interface between the first adhesive layer 2 and the release agent layer 7 in the state that the part of the bypass line 8 at the position with forming of the release agent layer 7 is attached to the first adhesive layer 2 and the second adhesive layer 5. At the position without forming of the release agent layer 7, the IC tag is torn in the second adhesive layer 5. Accordingly, the electronic circuit 3 is peeled off together with the substrate sheet 1 in the state that the electronic circuit 3 is attached to the first adhesive layer 2, and then the electronic circuit 3 is cut.

The shape of the bypass line 8 does not have any limitation, and includes various shapes such as shapes lacking a part of periphery line of ellipse and circle, shapes lacking a side of perimeter line of triangle, shapes lacking a side of perimeter line of quadrangle such as square, rectangle, rhomboid and trapezoid, shapes lacking a side of perimeter line of polygons such as pentagon and polygons having more than five angles.

The size of the bypass line 8 is normally small than the vacancy section surrounded by the electronic circuit, when the bypass line 8 is formed at the most inside circuit line 4. And, The size of the bypass line 8 is normally small than the size of the IC tag, when the bypass line 8 is formed at the most outside circuit line 4. The distance from the circuit line 4 to the portion of the bypass line 8 which is a longest way from the circuit line 4, is preferably not less than 2 mm.

The thickness of the bypass line 8 does not have any limitation, and is the same as the thickness of the electronic circuit. The preferable range of the thickness is the same as that of the electronic circuit.

The line width of the bypass line 8 does not have any limitation, and is preferably 0.01 to 10 mm, more preferably 0.1 to 3 mm.

The number of the bypass line 8 is preferably 1 to 10, more preferably 1 to 5. When the plural members of the bypass lines 8 are formed, the plural members of the bypass lines 8 may be same or different each other in shape and/or size.

The circuit lines 4 has preferably the planar projection 9 extended.

The shape of the planar projection 9 includes preferably symmetrical polygons such as square, regular hexagon, regular octagon and regular decagon, and symmetrical shapes such as circular, and approximate shapes thereof.

The planar projection 9 has preferably an area calculated according to the following formula.

$$S \geq (2W)^2$$

(In the formula, S is an area of the planar projection, and W is a line width of the circuit line adjoining to the planar projection.)

Further, the planar projection 9 has more preferably an area calculated according to the following formula.

$$S \geq (4W)^2$$

(In the formula, S and W are the same as described above.)

The upper limitation of the area of the planar projection 9 is preferably not more than 10%, more preferably not more than 5% and most preferably not more than 3% to the area of the vacancy section surrounded by the electronic circuit.

The thickness of the planar projection 9 does not have any limitation, and is the same as the thickness of the electronic circuit. The preferable range of the thickness is the same as that of the electronic circuit.

As shown in FIG. 3a and FIG. 6a, the planar projection 9 can be extended directly to the bypass line 8 of the circuit line 4 in the electronic circuit 3, or can be extended by connecting to the bonding line 10 between the planar projection 9 and the bypass line 8 of the circuit line 4.

As the result of such structure, as shown in FIG. 4, when the IC tag is peeled by providing a cutting 17 into the interface between the article 12 and the second adhesive layer 5 of the IC tag attached to the article 12 with a cutter or the like, inserting a finger or the like into the cutting 17 and pinching the end of the IC tag, the first adhesive layer 2 is peeled in interface between the first adhesive layer 2 and the release agent layer 7 at positions with forming of the release agent layer 7, in the state that the bypass line 8 or the planar projection 9 are attached to the first adhesive layer 2 and the second adhesive layer 5, and the IC tag is torn in interface between the article 12 and the second adhesive layer 5, or in the second adhesive layer 5 at positions without forming of the release agent layer 7. Accordingly, the electronic circuit 3 is peeled off together with the substrate sheet 1 in the state that the electronic circuit 3 is attached to the first adhesive layer 2, and then the electronic circuit 3 is cut.

As shown in FIG. 8 and FIG. 9, the planar projection 9 can be extended directly to the circuit line in the electronic circuit, or can be extended by connecting to the bonding line 10 between the planar projection 9 and the circuit line.

Figure 10:
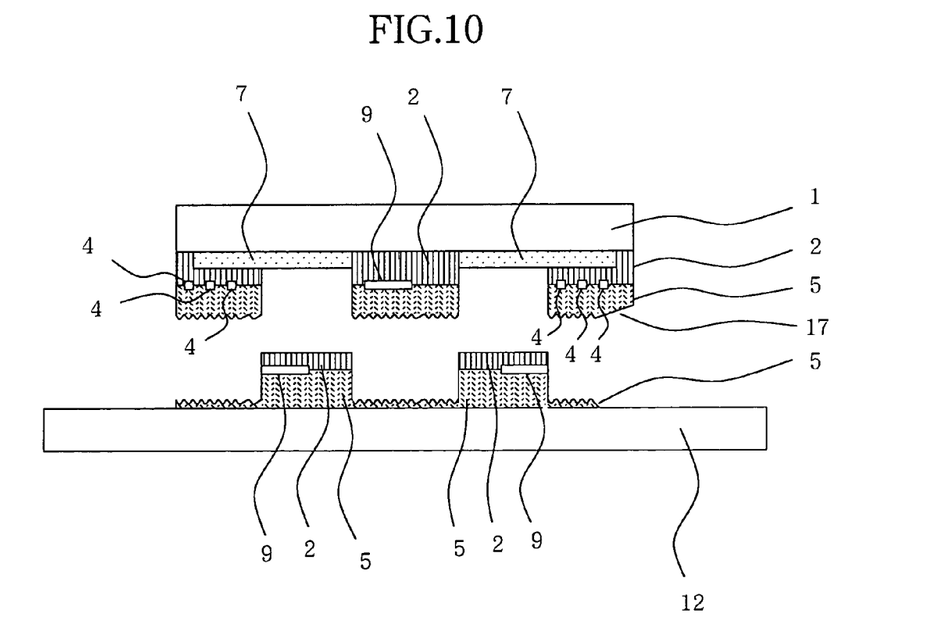
FIG. 10 shows an outline of perspective cross-section of a state that an IC tag of one embodiment of the present invention is peeled off.

As the result of such structure, when the antenna is not cut at the interface of the release agent layer, as shown in FIG. 10, the IC tag is peeled off in the state that a part of the planar projection is attached to the substrate sheet. Therefore, the antenna function is broken.

The planar projection 9 can be extended to the most inside circuit line 4 or the most outside circuit line 4 in the electronic circuit. Also, the planar projection 9 can be extended to any one circuit line 4 among the intermediate circuit lines 4. When the planar projection 9 is extended to the intermediate circuit line 4, the adjacent outside circuit line 4 is formed as avoiding the planar projection 9.

The number of the planar projection 9 is preferably 1 to 10, more preferably 1 to 5.

The material of the bypass line 8 is the same as that of the circuit line 4 in the electronic circuit. The bypass line 8 is preferably integral with the circuit line 4.

The material of the planar projection 9 is preferably the same as that of the circuit line 4 or the bonding line 10 in view of production process, and the planar projection 9 is more preferably integral with the circuit line 4 and the bonding line 10.

The material of the bonding line 10 is more preferably the same as that of the circuit line 4 or planar projection 9.

The method for extending the bypass line 8, the planar projection 9 and/or the bonding line 10 to the circuit line 4 in the electronic circuit 3 includes various methods. For example, various methods include a method for forming the electronic circuit together with the bypass line 8, the planar projection 9 and/or the bonding line 10 by etching a metal foil, and a method for forming the bypass line 8 by printing or applying to the circuit line 4 in the electronic circuit 3. The method for forming the electronic circuit together with the bypass line 8, the planar projection 9 and/or the bonding line 10 by etching a metal foil is more preferable.

When the bypass line 8 and the planar projection 9 are formed, they can be formed at the position without forming of the release agent layer 7. But, it is more preferable to form at least one of the bypass line 8 or the planar projection 9 at the position with forming of the release agent layer 7 in the circuit section. When the planar projection 9 is extended to the bypass line 8, it is preferable to form at least one of the bypass line 8 having the planar projection 9 extended at the position with forming of the release agent layer 7 in the circuit section.

As another embodiment of the IC tag of the present invention, as shown in FIG. 9 and FIG. 10, the planar projection 9 can be extended directly to the circuit line 4 in the electronic circuit 3, without forming of the bypass line 8 or the bonding line 10 to the circuit line 4 in the electronic circuit 3. In this case, the planar projection 9 can be formed at the position without forming of the release agent layer 7. But, it is more preferable to form at least one of the planar projection 9 at the position with forming of the release agent layer 7 in the circuit section. The number of the planar projection 9 is preferably in the range of 1 to 10, more preferably in the range of 1 to 5. When the plural members of the planar projection 9 are formed, the plural members of the planar projection 9 may be same or different in shape and/or size respectively.

The IC chip 6 is connected to both ends of the electronic circuit 3. The IC chip 6 can be formed inside of the electronic circuit 3, outside of the electronic circuit 3, or in the upper portion of the electronic circuit 3.

In order to connect the ends of most outside ring and most inside ring of the electronic circuit 3 to the IC chip 6, the end of most outside ring or most inside ring of the electronic circuit 3 is preferably connected to the IC chip 6 by forming the line (jumper circuit) from the end over the ring electronic circuit 3 in direction of the inside or the outside of the electronic circuit 3, without short circuit to the ring electronic circuit 3.

The method for forming the jumper circuit includes a method for forming a conductive circuit line 4 by printing insulating ink in line crossing the portion of the ring electronic circuit 3 from the end of the electronic circuit 3 by screen printing or the like, and then printing conductive paste in line on the printed insulating ink by screen printing or the like. The conductive paste includes that described before. The insulating ink includes light curable ink such as ultraviolet curable ink.

The method for connecting the IC chip 6 to the end of the electronic circuit 3 includes a method for connecting by forming an anisotropic conductive film on the surface of the end of the electronic circuit 3 and then connecting flip-chip bonding method via the anisotropic conductive film. The flip-chip bonding method is a method for conducting easily between the end of the electronic circuit 3 and the IC chip 6 by forming a wire bump to an electrode portion of the IC chip 6, and pressing the surface of the wire bump formed on the IC chip 6 to the anisotropic conductive film covered on the surface of the end of the electronic circuit 3 so that the wire bump insert in the anisotropic conductive film.

In the IC tag of the present invention, the second adhesive layer 5 is laminated to cover the electronic circuit 3, the IC chip 6 and the surface of the first adhesive layer 2 on which the electronic circuit 3 is not formed.

Adhesives used in the second adhesive layer 5 include various adhesives such as thermo melting adhesives, pressure-sensitive adhesives and thermosetting adhesives. The kinds of the adhesive include, for example, the same as adhesives used in the first adhesive layer 2, as described before.

The adhesives can be used singly or in combination of two or more members. Among the adhesives, the pressure sensitive adhesives are preferable and acrylic pressure sensitive adhesives are more preferable.

The surface of the second adhesive layer 5 is preferably flat.

Thickness of the second adhesive layer 5 does not have any limitation. However, the thickness of the portion covering the electronic circuit 3 and the IC chip 6 is different from the thickness of the portion covering the first adhesive layer 2. Maximum thickness is normally in the range of 10 to 100 μm and preferably in the range of 15 to 50 μm.

The surface of the second adhesive layer 5 can be covered with the release liner 11.

As the release liner 11, any release liners can be used. For example, release liners in which release treatment is conducted to the surface of the substrate to be contacted to the second adhesive layer 5 according to needs, can be used. As the substrate, films composed of various resins such as polyethylene terephthalate, polybutylene terephthalate, polyethylene, polypropylene and polyarylate, and various paper materials such as papers laminated with polyethylene, papers laminated with polypropylene, clay-coated papers, resin-coated papers and glassine papers are illustrated.

In the case, representative examples include a formation of release agent layer composed of release agent such as silicone resin, long-chain alkyl group-containing resin and fluororesin.

The thickness of the release liner 11 does not have any limitation. However, the thickness can be decided properly.

The second adhesive layer 5 can be formed by applying directly to the electronic circuit 3, the IC chip 6 and the surface of the first adhesive layer 2 in which the electronic circuit 3 is not formed. Further, after the second adhesive layer 5 is formed by applying the adhesive on the surface of the release agent layer of the release liner 11, the second adhesive layer 5 can be attached to the electronic circuit 3, the IC chip 6 and the surface of the first adhesive layer 2 in which the electronic circuit 3 is not formed.

Methods for forming the first adhesive layer 2, the second adhesive layer 5 and the release agent layer 7 do not have any limitation, and various methods can be used. The methods include, for example, air knife coater, blade coater, bar coater, gravure coater, roll coater, curtain coater, die coater, knife coater, screen coater, Mayer bar coater and kiss coater.

As shown in FIG. 10, when the IC tag of another embodiment of the present invention is peeled off after the IC tag is attached to the article 12, the IC tag is peeled off in the same state as shown in FIG. 4, except that the bypass line 8 does not exist. As the result, the electronic circuit 3 is cut.

EXAMPLES

The present invention will be explained by examples more concretely in the next paragraph. In addition, the present invention was not restricted at all by these examples.

Example 1

A release agent layer 7 was formed by applying a silicone resin release agent in the shape as indicated in FIG. 2 (having angle of the oblique line in trapezoid of 45°, width of unapplied portion of 3 mm, area covered with two trapezoids and surrounded by an outside circumference of the electronic circuit of about 75 percents of area surrounded by an outside circumference of the electronic circuit, and space length between the end of trapezoid and the outside of the substrate sheet 1 of 1 mm), on one surface of polyethylene terephthalate film (having width of 100 mm, length of 50 mm and thickness of 50 μm) in an amount to form the dried thickness of 0.05 μm and then drying and curing at 130° C. for 1 minutes. Next, polyester type thermo melting adhesive (produced by TOYO BOSEKI CO., LTD., trade name "BAYRON 30SS") was applied on the surface of the release agent layer 7 and the substrate sheet 1 by gravure coater in amount to form the dried thickness of 5 μm to laminate the first adhesive layer 2. Further, on the surface of the first adhesive layer 2, an electrolytic copper foil having thickness of 35 μm was heated and pressed by heat seal roll of 100° C. Next, on the surface of the electrolytic copper foil, etching resist ink was printed in decaplet ring circuit line 4 (antenna) having long side of 45 mm, short side of 15 mm and line width of 0.15 mm and also in the bypass line 8 connected to the most inside circuit line 4 having line width of 0.15 mm by screen-printing method, as indicated in FIG. 2.

The printed electrolytic copper foil was etching-treated with a solution of ferric chloride to remove the portion other than the ring circuit line 4 and the bypass line 8. And then, the etching resist ink was removed with an aqueous alkali solution to form the electronic circuit 3 having the bypass line 8 as shown in FIG. 2.

With respect to size of the bypass line 8 and the angle θ of the tangent, the bypass line 8 having a shape lacking a long side of perimeter of rectangle has length of 5 mm, width of 7 mm and the angle θ of 90 degree. The bypass line 8 having a shape lacking a side of perimeter of equilateral triangle has side length of 7 mm and the angle θ of 60 degree. The bypass line 8 having a shape of circle perimeter of semicircle has semidiameter of 3 mm and the angle θ of 85 degree. The bypass line 8 having a shape lacking a upper bottom side of perimeter of trapezoid has lower bottom side length of 10 mm, upper bottom side length of 3 mm, height of 5 mm and the angle θ of 145 degree.

In order to conduct the end of most inside ring of the electronic circuit 3 (antenna) and the end of most outside of the electronic circuit 3, an ultraviolet curable ink was printed to the space between them in line shape by screen printing method. And then, ultraviolet light was irradiated to cure the ultraviolet curable ink. Next, a silver paste (average particle diameter of silver particle of 5 μm, binder of polyester resin) was printed in line shape (having length of 10 mm) on the surface of the cured line of the ultraviolet curable ink, and dried to form the jumper circuit.

Next, a wire bump was formed at the electrode portion of an IC chip 6 (produced by PHILIPS CO., trade name of "I/CODE") with a gold wire. The IC chip 6 was connected to the both ends of the circuit through an anisotropic conductive film (produced by SONY CHEMICAL CO., LTD., trade name of "FP2322D") by using the flip chip bonding method.

On the other hand, a release liner 11 having the second adhesive layer 5 was prepared by applying an acrylic pressure sensitive adhesive (produced by LINTEC CORPORATION, trade name of "PA-T1") on the release-treated surface of the release liner obtained by release-treating all surface of one side of a glassine paper having thickness of 70 μm with silicone resin by using roll knife coater, and drying to form the second adhesive layer 5 having thickness of 10 μm.

Next, by attaching the second adhesive layer 5 in the release liner 11 having the second adhesive layer 5 to all of the surface forming the electronic circuit 3 and the IC chip 6 of the substrate sheet 1, the second adhesive layer 5 was covered on the first adhesive layer 2, the electronic circuit 3 and the IC chip 6 to prepare the IC tag.

The obtained IC tag was tested by non-contact transmitting and receiving test. As the result, the transmitting and receiving could be conducted correctly.

The all surface-treated release liner 11 in the IC tag was peeled off, and the IC tag was attached to a polypropylene resin plate. After 24 hours, the IC tag was peeled off from the polypropylene resin plate by providing the cutting 17 in the second adhesive layer by the length from the end of the IC tag to 5 mm inside with a cutter knife. The portion of the electronic circuit 3 covered with the release agent layer 7 was left on the polypropylene resin plate. The portion other than the release agent layer 7 was peeled off from the polypropylene resin plate together with the polyethylene terephthalate sheet of the substrate sheet 1. According to the peeling, the electronic circuit 3 was cut. The peeled IC tag was tested by non-contact transmitting and receiving test (peeling and cutting test). As the result, the transmitting and receiving could be not conducted.

The peeling and cutting test was conducted to 30 IC tags. As the result, 30 IC tags were cut.

Example 2

The IC tag was prepared in the same method as described in Example 1 except that the planar projection 9 and the release agent layer 7 were formed as shown in FIG. 3a. The shape of the release agent layer 7 has angle of the oblique line in regular triangle arranged at the bith ends of the circuit section of 45°, width of unapplied portion of 3 mm, area covered with triangles in the both ends of the circuit section and rhomboid in the center section of the circuit section and surrounded by an outside circumference of the electronic circuit 3 and the IC chip 6 of about 70 percents of area surrounded by an outside circumference of the electronic circuit, and space length between the end of triangle and the outside of the substrate sheet 1 of 1 mm. The shape and size of the bypass line 8 are the same as that in Example 1. The size of the planar projection 9 is a circle having diameter of 2 mm and thickness of 35 mm. The bonding line 10 has length of 0.5 mm, width of 0.1 mm and thickness of 35 μm. The obtained IC tag was tested by non-contact transmitting and receiving test. As the result, the transmitting and receiving could be conducted correctly.

The peeling and cutting test was conducted to 30 IC tags. As the result, 30 IC tags were cut.

Example 3

The IC tag was prepared in the same method as described in Example 1 except that the bypass line 8 was not formed, the planar projection 9 was extended directly to the circuit line 4, and the planar projection 9 and the release agent layer 7 were formed as shown in FIG. 6a. The shape of the release agent layer 7 has angle of the oblique line in pentagon of 45°, width of unapplied portion of 3 mm, area covered with two pentagon and surrounded by an outside circumference of the electronic circuit 3 of about 60 percents of area surrounded by an outside circumference of the electronic circuit, and space length between the end of pentagon and the outside of the substrate sheet 1 of 1 mm. The size of the planar projections 9 are each a circle having diameter of 2 mm and a square having side length of 2 mm, and thickness of 35 mm. The bonding line 10 has length of 0.5 mm, width of 0.1 mm and thickness of 35 μm. The obtained IC tag was tested by non-contact transmitting and receiving test. As the result, the transmitting and receiving could be conducted correctly.

The peeling and cutting test was conducted to 30 IC tags. As the result, 30 IC tags were cut.

Example 4

A release agent layer 7 was formed by applying a silicone resin release agent in the shape as indicated in FIG. 8 (having angle of the oblique line in trapezoid of 45°, width of unapplied portion of 3 mm, area covered with two trapezoids and surrounded by an outside circumference of the electronic circuit of about 75 percents of area surrounded by an outside circumference of the electronic circuit, and space length between the end of trapezoid and the outside of the substrate sheet 1 of 1 mm), on one surface of polyethylene terephthalate film (having width of 100 mm, length of 50 mm and thickness of 50 μm) in an amount to form the dried thickness of 0.05 μm and then drying and curing at 130° C. for 1 minutes. Next, polyester type thermo melting adhesive (produced by TOYO BOSEKI CO., LTD., trade name "BAYRON 30SS") was applied on the surface of the release agent layer 7 and the substrate sheet 1 by gravure coater in amount to form the dried thickness of 3 μm to laminate the first adhesive layer 2. Further, on the surface of the first adhesive layer 2, an electrolytic copper foil having thickness of 35 μm was heated and pressed by heat seal roll of 100° C. Next, on the surface of the electrolytic copper foil, etching resist ink was printed in decaplet ring circuit line 4 (antenna) having long side of 45 mm, short side of 15 mm and line width of 0.15 mm and also in the planar projection 9 and the bonding line 10 connected to the most inside circuit line by screen-printing method, as indicated in FIG. 8.

The printed electrolytic copper foil was etching-treated with a solution of ferric chloride to remove the portion other than the ring circuit line, the planar projection 9 and the bonding line 10. And then, the etching resist ink was removed with an aqueous alkali solution to form the electronic circuit 3 having the planar projection 9 and the bonding line 10 extend as shown in FIG. 8. The size of the planar projection 9 are each a circle having diameter of 1 mm and thickness of 35 mm. The bonding line 10 has length of 0.5 mm, width of 0.1 mm and thickness of 35 μm.

In order to conduct the end of most inside ring of the electronic circuit 3 (antenna) and the end of most outside of the electronic circuit 3, an ultraviolet curable ink was printed to the space between them in line shape by screen printing method. And then, ultraviolet light was irradiated to cure the ultraviolet curable ink. Next, a silver paste (average particle diameter of silver particle of 5 μm, binder of polyester resin) was printed in line shape (having length of 10 mm) on the surface of the cured line of the ultraviolet curable ink, and dried to form the jumper circuit.

Next, a wire bump was formed at the electrode portion of an IC chip 6 (produced by PHILIPS CO., trade name of "I/CODE") with a gold wire. The IC chip 6 was connected to the both ends of the circuit through an anisotropic conductive film (produced by SONY CHEMICAL CO., LTD., trade name of "FP2322D") by using the flip chip bonding method.

On the other hand, a release liner 11 having the second adhesive layer 5 was prepared by applying an acrylic pressure-sensitive adhesive (produced by LINTEC CORPORATION, trade name of "PA-T1") on the release-treated surface of the release liner obtained by release-treating all surface of one side of a glassine paper having thickness of 70 μm with silicone resin by using roll knife coater, and drying to form the second adhesive layer 5 having thickness of 20 μm.

Next, by attaching the second adhesive layer 5 in the release liner 11 having the second adhesive layer 5 to all of the surface forming the electronic circuit 3 and the IC chip 6 of the substrate sheet 1, the second adhesive layer 5 was covered on the first adhesive layer 2, the electronic circuit 3 and the IC chip 6 to prepare the IC tag.

The obtained IC tag was tested by non-contact transmitting and receiving test. As the result, the transmitting and receiving could be conducted correctly.

The all surface-treated release liner 11 in the IC tag was peeled off, and the IC tag was attached to a polypropylene resin plate. After 24 hours, the IC tag was peeled off from the polypropylene resin plate by providing the cutting 17 in the second adhesive layer by the length from the end of the IC tag to 5 mm inside with a cutter knife.

The peeling and cutting test was conducted to 10 IC tags. As the result, 10 IC tags were cut.

Example 5

The IC tag was prepared in the same method as described in Example 1 except that the planar projection 9 and the release agent layer 7 (having area covered with two quadrangle and surrounded by an outside circumference of the electronic circuit of about 75 percents of area surrounded by an outside circumference of the electronic circuit) were formed as shown in FIG. 9. The size of the planar projection 9 is a square having side length of 2 mm and thickness of 35 mm. The obtained IC tag was tested by non-contact transmitting and receiving test. As the result, the transmitting and receiving could be conducted correctly.

The peeling and cutting test was conducted to 10 IC tags in the same method as described in Example 1. As the result, 10 IC tags were cut.

Example 6

Figure 11:
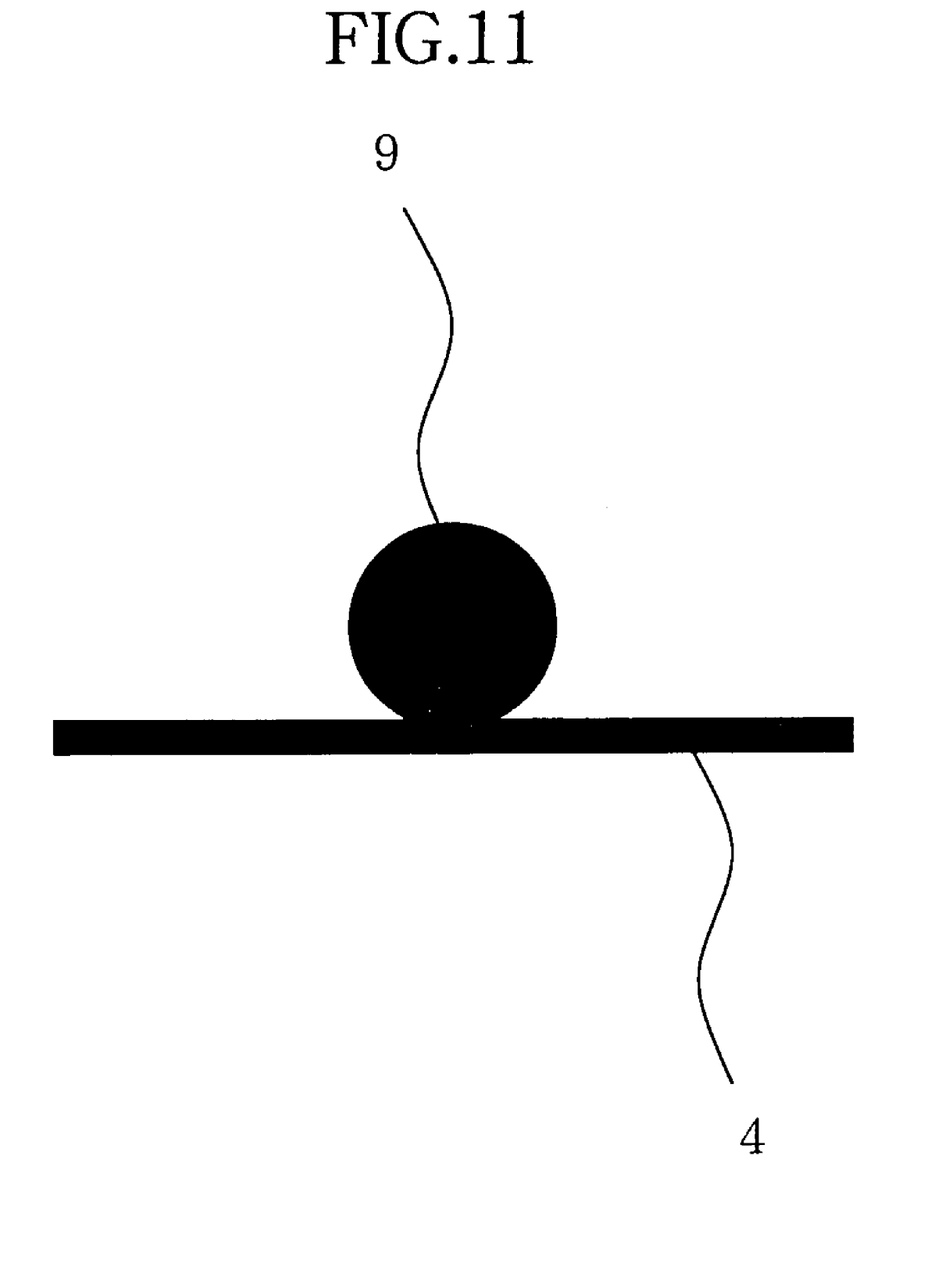
FIG. 11 shows a plane view of a shape of a planar projection extended to the circuit line of one embodiment in an IC tag of the present invention.

The IC tag was prepared in the same method as described in Example 2 except that the planar projection 9 was formed in a shape as shown in FIG. 11. The size of the planar projection 9 is a circle having diameter of 2 mm and thickness of 35 mm. The obtained IC tag was tested by non-contact transmitting and receiving test. As the result, the transmitting and receiving could be conducted correctly.

The peeling and cutting test was conducted to 10 IC tags in the same method as described in Example 1. As the result, 10 IC tags were cut.

Comparative Example 1

The IC tag was prepared in the same method as described in Example 1 except that the bypass line 8 was not formed. The obtained IC tag was tested by non-contact transmitting and receiving test. As the result, the transmitting and receiving could be conducted correctly.

The peeling and cutting test was conducted to 10 IC tags in the same method as described in Example 1. As the result, 6 IC tags among 10 IC tags could be peeled without breaking of the electronic circuit. The IC tags peeled without breaking of the electronic circuit were tested by non-contact transmitting and receiving test. As the result, the transmitting and receiving could be conducted correctly.

The IC tag of the present invention can be utilized as the management tag of articles such as goods, storage articles and loadings.

What is claimed is:

1. An IC tag which has a structure comprising a first adhesive layer laminated on a surface of a substrate sheet, an electronic circuit containing a circuit line having a bypass line, in which the angle formed by the tangent of the bypass line at the connection between the bypass line and the circuit line and the tangent of the circuit line at the connection is 45° or greater, and an IC chip connecting to the electronic circuit, the IC chip and the electronic circuit being formed on a surface of the first adhesive layer, a second adhesive layer laminated for covering the electronic circuit and the IC chip, and a release agent layer formed partly at the position corresponding to a circuit section consisting of the electronic circuit and the IC chip and located at the interface between the substrate sheet and the first adhesive layer,     wherein the bypass line is formed in the middle section of the circuit line spaced from both end points of the circuit line.

2. The IC tag as claimed in claim 1, wherein a planar projection is extended to the bypass line.

3. The IC tag as claimed in claim 1, wherein the release agent layer is formed to cover the range of 20 to 90 percents of an area surrounded by an outside circumference.

4. The IC tag as claimed in claim 1, wherein a release liner is formed on a surface of the second adhesive layer.

5. An IC tag which has a structure comprising a first adhesive layer laminated on a surface of a substrate sheet, an electronic circuit having a planar projection extended and an IC chip connecting to the electronic circuit, the IC chip and the electronic circuit being formed on a surface of the first adhesive layer, a second adhesive layer laminated for covering the electronic circuit and the IC chip, and a release agent layer formed partly at the position corresponding to a circuit section consisting of the electronic circuit and the IC chip and located at the interface between the substrate sheet and the first adhesive layer,     wherein at least one bypass line is formed at the position in the circuit section in which the release agent layer is formed.

6. The IC tag as claimed in claim 5, wherein the planer projection has an area calculated according to the following formula.

$$S=(SW)2$$

(In the formula, S is an area of the planar projection, and W is a line width of the circuit line adjoining to the planar projection).

7. An IC tag which has a structure comprising a first adhesive layer laminated on a surface of a substrate sheet, on electronic circuit having a planer projection extended and an IC chip connecting to the electronic circuit, the IC chip and the electronic circuit being formed on a surface of the first adhesive layer, a second adhesive layer laminated for covering the electronic circuit and the IC chip, and a release agent layer formed partly at the position corresponding to both end portions of a circuit section consisting of the electronic circuit and the IC chip and located at the interface between the substrate sheet and the first adhesive layer,     wherein at least one of bypass line is formed at the position in the circuit section in which the release agent layer is formed.

* * * * *